US010700566B2

(12) United States Patent
Kato et al.

(10) Patent No.: US 10,700,566 B2
(45) Date of Patent: Jun. 30, 2020

(54) ELECTRIC MOTOR AND COMPRESSOR PROVIDED WITH THE SAME

(71) Applicant: Mitsubishi Electric Corporation, Tokyo (JP)

(72) Inventors: Keisuke Kato, Tokyo (JP); Yuki Tamura, Tokyo (JP); Koji Masumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/321,545

(22) PCT Filed: Oct. 6, 2016

(86) PCT No.: PCT/JP2016/079850
§ 371 (c)(1),
(2) Date: Jan. 29, 2019

(87) PCT Pub. No.: WO2018/066112
PCT Pub. Date: Apr. 12, 2018

(65) Prior Publication Data
US 2019/0222081 A1    Jul. 18, 2019

(51) Int. Cl.
*H02K 3/34* (2006.01)
*H02K 1/16* (2006.01)
(Continued)

(52) U.S. Cl.
CPC ............... *H02K 3/34* (2013.01); *H02K 1/148* (2013.01); *H02K 1/16* (2013.01); *H02K 3/345* (2013.01);
(Continued)

(58) Field of Classification Search
CPC .......... H02K 1/146; H02K 1/148; H02K 3/30; H02K 3/32; H02K 3/34; H02K 3/38; H02K 3/522; H02K 3/525
(Continued)

(56) References Cited

U.S. PATENT DOCUMENTS 8,610,328 B2 * 12/2013 Yoshida ................. H02K 3/522
 310/194
10,063,118 B2 * 8/2018 Yoshida ................... H02K 3/18
(Continued)

FOREIGN PATENT DOCUMENTS

JP    2003-061286 A    2/2003
JP    2007-259627 A    10/2007
(Continued)

OTHER PUBLICATIONS

International Search Report of the International Searching Authority dated Nov. 8, 2016 for the corresponding international application No. PCT/JP2016/079850 (and English translation).
(Continued)

*Primary Examiner* — Quyen P Leung
*Assistant Examiner* — Minki Chang
(74) *Attorney, Agent, or Firm* — Posz Law Group, PLC

(57) ABSTRACT

An electric motor includes a stator unit, insulators, windings and insulating films. In the stator unit, a plurality of stators including respective iron cores each made of a magnetic body are arranged annularly. The insulators are provided at ends of the iron cores in an axial direction of the stator unit. The windings are wound around the insulators. The insulating films insulate the iron cores and the windings from each other. The insulating films are fixed between the iron cores and the insulators.

14 Claims, 16 Drawing Sheets

(51) Int. Cl.
*H02K 3/52* (2006.01)
*H02K 1/14* (2006.01)

(52) U.S. Cl.
CPC ............. *H02K 3/522* (2013.01); *H02K 3/525* (2013.01); *H02K 2203/12* (2013.01)

(58) Field of Classification Search
USPC .................................. 310/195, 214, 216.008
See application file for complete search history.

(56) References Cited

U.S. PATENT DOCUMENTS

| | | |
|---|---|---|
| 2007/0222324 A1 | 9/2007 | Fukui et al. |
| 2012/0080976 A1* | 4/2012 | Oka ....................... H02K 3/325 310/215 |
| 2012/0299410 A1 | 11/2012 | Yoshida et al. |

FOREIGN PATENT DOCUMENTS

| | | |
|---|---|---|
| JP | 2009-055742 A | 3/2009 |
| JP | 2009-171720 A | 7/2009 |
| JP | 2010-045868 A | 2/2010 |
| JP | 2013-172518 A | 9/2013 |
| JP | 5306411 B2 | 10/2013 |
| JP | 2014-173525 A | 9/2014 |
| JP | 2016-036223 A | 3/2016 |

OTHER PUBLICATIONS

Office Action dated Jan. 7, 2020 issued in corresponding JP patent application No. 2018-543543 (and English anslation).

* cited by examiner

SECTION TAKEN ALONG LINE B-B IN FIG. 14

SECTION TAKEN ALONG LINE A-A IN FIG. 13

ELECTRIC MOTOR AND COMPRESSOR PROVIDED WITH THE SAME

CROSS REFERENCE TO RELATED APPLICATION

This application is a U.S. national stage application of PCT/JP2016/079850 filed on Oct. 6, 2016, the contents of which are incorporated herein by reference.

TECHNICAL FIELD

The present invention relates to an electric motor made while attaching importance to an insulation performance, and a compressor provided with the electric motor.

BACKGROUND ART

In a conventional electric motor, a drive unit includes an annular stator and a rotor provided rotatably on an inner peripheral side of the stator. The stator includes a plurality of iron cores each made of a magnetic body. With each iron core, an insulator is engaged. Around the insulator, a winding is wound. In the winding, electric current flows.

In such an electric motor, when the rotor rotates, a bearing, etc., slide, and metals rub against each other. As a result, foreign substances such as abrasion powder are generated. Such foreign substances deteriorate the insulated state of elements of the electric motor, such as windings and iron cores. Therefore, electric motors taking countermeasures against generation of foreign substances have been proposed.

An electric motor including windings impregnated with varnish is well known as an example of an electric motor provided with a mechanism which is made by taking countermeasures against the generation of foreign substances (see, for example, Patent Literature 1). In this electric motor, the windings are coated with varnish, and are thus prevented from being damaged by foreign substances, whereby the insulating characteristic of the surfaces of the windings is improved.

Also, it is known that windings of an electric motor are covered by an engagement recess of a balancer cover (see Patent Literature 2, for example). In the electric motor disclosed by Patent Literature 2, since the balancer cover is made of resin, it is possible to cover windings, and prevent foreign matters from adhering to the windings.

CITATION LIST

Patent Literature

Patent Literature 1: Japanese Unexamined Patent Application Publication No. 2013-172518
Patent Literature 2: Japanese Unexamined Patent Application Publication No. 2014-173525

SUMMARY OF INVENTION

Technical Problem

As described above, in the past, a countermeasure is taken to prevent the adhesion or deposition of foreign substances to or on windings or other elements. However, the protection of windings with varnish as disclosed by Patent Literature 1 requires extra time and labor for impregnating and adhering varnish into windings wound, thus increasing the cost required for processing and the cost of material including varnish.

Also, the compressor provided with the balancer cover disclosed in Patent Literature 2 has a complicated shape, and may thus affect cooling of the electric motor.

Furthermore, electric motors are present which adopts a configuration that metal abrasion powder is attracted by a magnet or the like. However, in such an electric motor, nonmagnetic metal such as aluminum or copper cannot be attracted, and as a result the insulation performance of the electric motor may be deteriorated.

An electric motor according to an embodiment of the present invention and a compressor provided with the electric motor have been made to solve the above problem, and an object of the invention is to prevent deterioration of the insulation performance which would occur when foreign substances generated by sliding parts of the electric motors such as a bearing, adhere to windings or iron cores, and ensure an appropriate insulation distance, thereby preventing failure of the electric motor.

Solution to Problem

An electric motor according to an embodiment of the present invention includes a stator unit in which a plurality of stators including respective iron cores each made of a magnetic body are arranged annularly; insulators provided at respective ends of the iron cores in an axial direction of the stator unit; windings wound around the insulators; and insulating films insulating the iron cores and the windings from each other. The insulating films are fixed between the iron cores and the insulators.

Advantageous Effects of Invention

In the electric motor according to the embodiment of the present invention and a compressor provided with the electric motor, iron cores can be insulated from respective windings by an appropriate distance. Therefore, the reliability is improved.

DESCRIPTION OF EMBODIMENTS

Embodiments of the present invention will now be described with reference to the drawings. The following embodiments do not limit the present invention.

Embodiment 1

Figure 1:
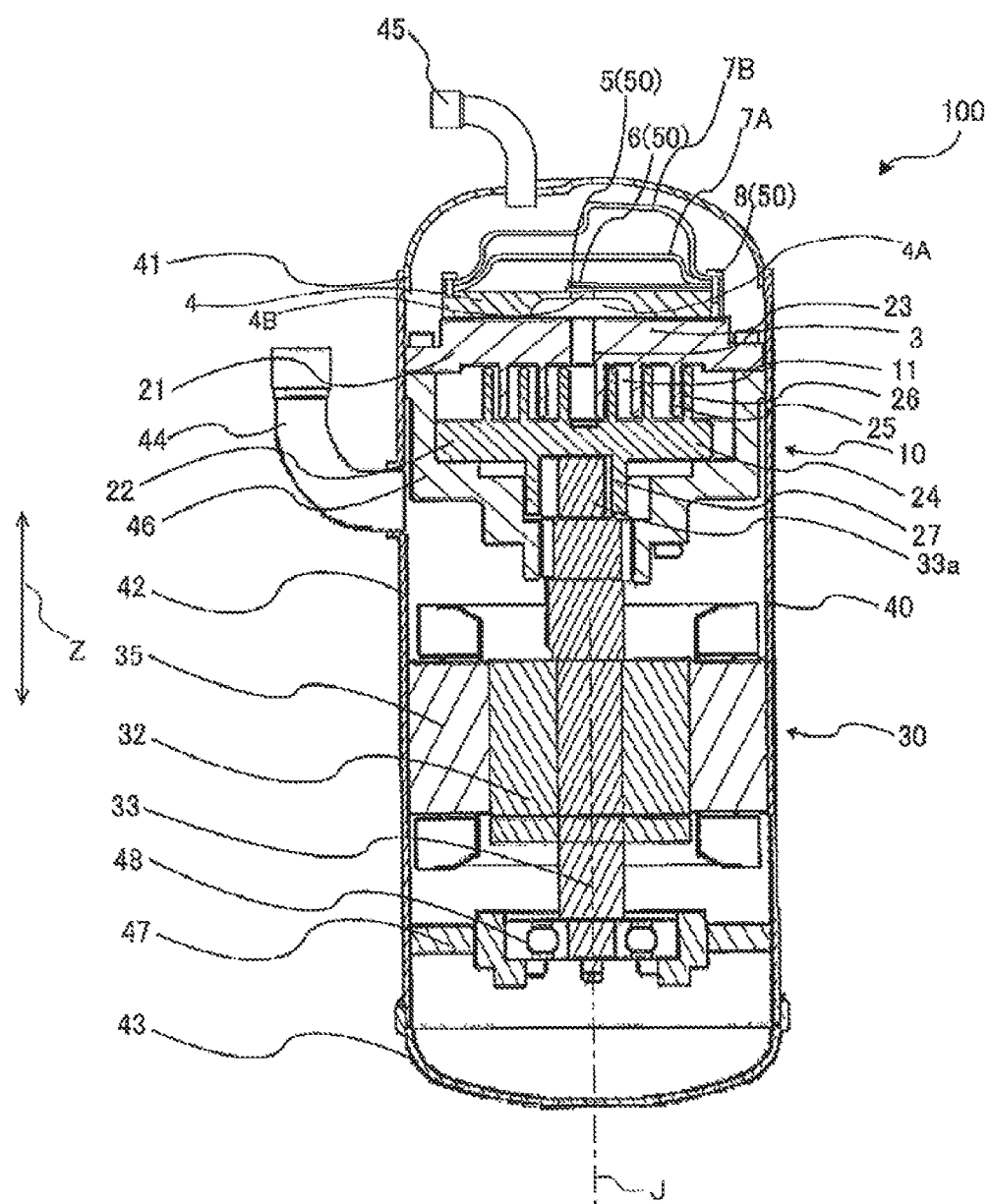
FIG. 1 is a vertical sectional view schematically illustrating a configuration of a compressor 100 in embodiment 1 of the present invention.

FIG. 1 is a vertical sectional view schematically illustrating a configuration of a compressor 100 according to embodiment 1 of the present invention.

In embodiment 1, the compressor 100 is one of structural elements of a refrigeration cycle apparatus for use in, for example, an air-conditioning apparatus, a refrigerator, a freezer, a vending machine or a water heater. The compressor 100 is a piece of fluid machinery which sucks refrigerant circulating in a refrigeration cycle, compresses the sucked refrigerant, and then discharges the refrigerant. In the following drawings including FIG. 1, the relationship in size between structural elements and the shapes, etc. thereof may be different from actual ones. In embodiment 1, the following description is made by referring to by way of example that the compressor 100 is a scroll compressor. In the drawings, an X direction and a Y direction are directions defined in the same plane (for example, a horizontal plane), and a Z direction is a direction orthogonal to the X direction and the Y direction, and corresponds to, for example, a vertical direction.

[Regarding Compressor 100]

As illustrated in FIG. 1, the compressor 100 includes a compressing mechanism unit 10 including a compression chamber 11 in which refrigerant is compressed, an electric motor unit 30 which drives the compressing mechanism unit 10, and a pressure vessel 40 in which the compressing mechanism unit 10 and the electric motor unit 30 are provided. The compressing mechanism unit 10 includes a discharge port 3 which allows the refrigerant compressed in the compression chamber 11 to be discharged therethrough. The pressure vessel 40 includes, for example, a cylindrical body portion 42, an upper vessel 41 press-fitted in an opening provided on an upper side of the body portion 42, and a lower vessel 43 press-fitted in an opening provided on a lower side of the body portion 42. To the pressure vessel 40, a suction pipe 44 and a discharge pipe 45 are connected. The suction pipe 44 is a pipe for sucking refrigerant from the outside into the pressure vessel 40, and the discharge pipe 45 is a pipe for discharging the compressed refrigerant to the outside of the pressure vessel 40.

The compressor 100 includes a chamber 4 provided in the pressure vessel 40 and located on a fixed scroll 21. The chamber 4 includes a depressed portion 4A in which the refrigerant discharged from the discharge port 3 of the compressing mechanism unit 10 is stored. The depressed portion 4A is depressed from a lower side in the Z direction toward an upper side therein The depressed portion 4A includes a discharge port 4B which is provided in a central part of the depressed portion 4A to extend in the Z direction. The discharge port 3 and the depressed portion 4A communicate with each other. The depressed portion 4A and the discharge port 4B communicate with each other. Therefore, the refrigerant compressed in the compression chamber 11 is discharged into a discharge muffler 7A to be described later, through the discharge port 3, the depressed portion 4A and the discharge port 4B.

The compressor 100 further includes a discharge valve 5 and a valve retainer 6 which are provided in the pressure vessel 40 and located on the chamber 4. The discharge valve 5 and the valve retainer 6 are fixed on the chamber 4 by fixing elements 8 such as bolts, at one end side of each of the discharge valve 5 and the valve retainer 6. The discharge valve 5, the valve retainer 6 and the fixing members 8 will be hereinafter collectively referred to as a discharge valve mechanism 20. That is, the discharge valve mechanism 20 includes the discharge valve 5, the valve retainer 6 and the fixing members 8.

The compressor 100 includes the discharge muffler 7A and a discharge muffler 7B, which are provided in the pressure vessel 40 and located on the chamber 4. The discharge muffler 7B is provided over the discharge muffler 7A. A lower surface of the discharge muffler 7A and an upper surface of the chamber 4, etc., define space into which the refrigerant is discharged through the discharge port 4B. The discharge muffler 7A includes, for example, a plurality of holes (not illustrated), through which the refrigerant flows from a discharge-muffler-7A side toward a discharge-muffler-7B side. A lower surface of the discharge muffler 7B and an upper surface of the discharge muffler 7A, etc., define space from which the refrigerant is discharged from the discharge-muffler-7A side. The discharge muffler 7B also has holes (not illustrated) through which the refrigerant flows into an inner space of the pressure vessel 40. The refrigerant having flowed out of the discharge muffler 7B is discharged from the compressor 100 through the discharge pipe 45.

The compressing mechanism unit 10 has a function of compressing, in the compression chamber 11, gas refrigerant sucked through the suction pipe 44, when the compressing mechanism unit 10 is driven by the electric motor unit 30, and then discharging the gas refrigerant into the space in the discharge muffler 7A through the discharge port 3. The compressing mechanism unit 10 includes the fixed scroll 21 and an orbiting scroll 22.

The fixed scroll 21 is fixed to a first frame 46 by bolts or the like. The first frame 46 is fixedly supported in the pressure vessel 40. The fixed scroll 21 includes a base plate portion 23 and a scroll lap 25 which is a projection formed in the shape of an involute curve and located upright on one side (in embodiment 1, a lower surface) of the base plate portion 23. The fixed scroll 21 has, in a central part thereof, the discharge port 3 through which the gas refrigerant compressed in the compression chamber 11 and thus having a high pressure is discharged. On an outlet side of the discharge port 3f (the other side of the base plate portion 23), the discharge valve mechanism 20 is provided. The discharge valve mechanism 20 opens/closes the discharge port 3 in accordance with the pressure at which the refrigerant is discharged, and prevents backflow of the refrigerant.

The orbiting scroll 22 is rotatably supported by the first frame 46. The orbiting scroll 22 is revolved (makes an orbital motion) around the fixed scroll 21 by an Oldham coupling not illustrated, without rotating on its axis. The orbiting scroll 22 includes a base plate portion 24 and a scroll lap 26 which is a projection in the shape of an involute curve and located upright on one side (in embodiment 1, an upper surface) of the base plate portion 24. The base plate portion 24 includes a hollow cylindrical orbiting-scroll boss portion 27 in a substantially central part of the other side (thrust surface) of the base plate portion 24. In the orbiting-scroll boss portion 27, an eccentric shaft portion 33a is fitted. The eccentric shaft portion 33a is provided at an upper end of a rotating shaft 33 to be described later.

The fixed scroll 21 and the orbiting scroll 22 are engaged with each other such that the scroll lap 25 and the scroll lap 26 mesh with each other, and are set in the pressure vessel 40. The compression chamber 11 is provided between the scroll lap 25 and the scroll lap 26. In the compression chamber 11, as the orbiting scroll 22 makes the orbital motion, the relative positional relationship between the scroll lap 25 and the scroll lap 26 varies, and as a result, the capacity of the compression chamber 11 varies.

The first frame 46 supports the orbiting scroll 22 such that the orbiting scroll 22 is slidable on a thrust plate not illustrated which is provided in the first frame 46. A top of the first frame 46 is closed by the fixed scroll 21. A bottom of the first frame 46 is provided with a bearing which holds the rotating shaft 33 in such a way as to allow it to be rotated. The first frame 46 is made of an iron-based magnetic material.

The electric motor unit 30 includes stators 31 fixed to the pressure vessel 40, and a rotor 32 which is rotatably attached to the stators 31, and which is rotated when the stators 31 are electrified. The rotating shaft 33 is attached the center of the rotor 32. At an upper end of the rotating shaft 33, the eccentric shaft portion 33a is formed. The eccentric shaft portion 33a is rotatably engaged with the orbiting-scroll boss portion 27. When the electric motor unit 30 drives the orbiting scroll 22 by rotating the rotating shaft 33, the gas refrigerant in the compressing mechanism unit 10 is compressed.

In the pressure vessel 40, a second frame 47 is fixed below the electric motor unit 30. The second frame 47 has a function of supporting a ball bearing 48 in the pressure vessel 40. In a central part of the second frame 47, an outer ring of the ball bearing 48 is press-fitted in a central part thereof. The ball bearing 48 supports the lower end of the rotating shaft 33 in such a way as to allow it to be rotated.

In the compressor 100 having the above configuration, when the stators 31 of the electric motor unit 30 are electrified, the rotor 32 and the rotating shaft 33 attached to the rotor 32 are rotated. In accordance with rotation of the rotating shaft 33, the orbiting scroll 22 makes the orbital motion around the fixed scroll 21. Therefore, the capacity of the compression chamber 11 provided between the scroll lap 25 of the fixed scroll 21 and the scroll lap 26 of the orbiting scroll 22 changes continuously. In this case, as the capacity of the compression chamber 11 increases, the inner pressure of the compression chamber 11 drops to a value lower than the inner pressure of the pressure vessel 40 (suction space), whereby the refrigerant in the pressure vessel 40 is sucked into the compression chamber 11. Subsequently, as the capacity of the compression chamber 11 decreases in accordance with the orbital motion of the orbiting scroll 22, the refrigerant sucked into the compression chamber 11 is compressed, and thus the inner pressure of the compression chamber 11 rises. When the inner pressure of the compression chamber 11 rises to a value higher than a predetermined value, the compressed refrigerant pushes up the discharge valve 5 of the discharge valve mechanism 20, and is discharged into the space in the discharge muffler 7A.

[Outline Configurations of Stator 31 and Iron Core 50]

The following description is made on the premise that a center axis J of a stator unit 5 extends in the Z direction (the vertical direction).

Figure 2:
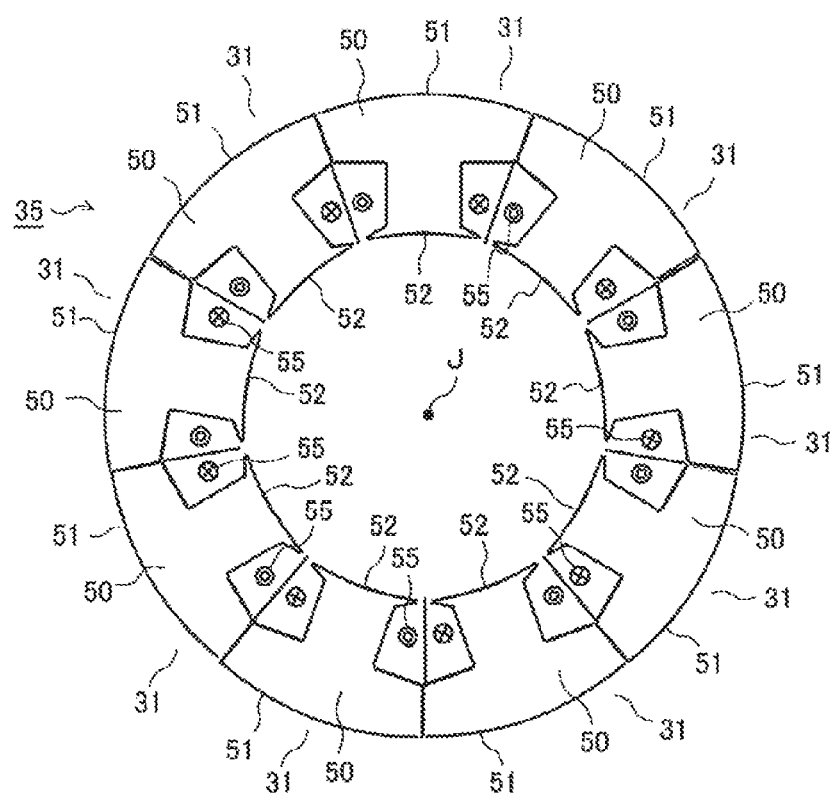
FIG. 2 is a top view of a stator unit 35 in embodiment 1 of the present invention.

FIG. 2 is a top view of the stator unit 35 in embodiment 1 of the present invention.

Figure 3:
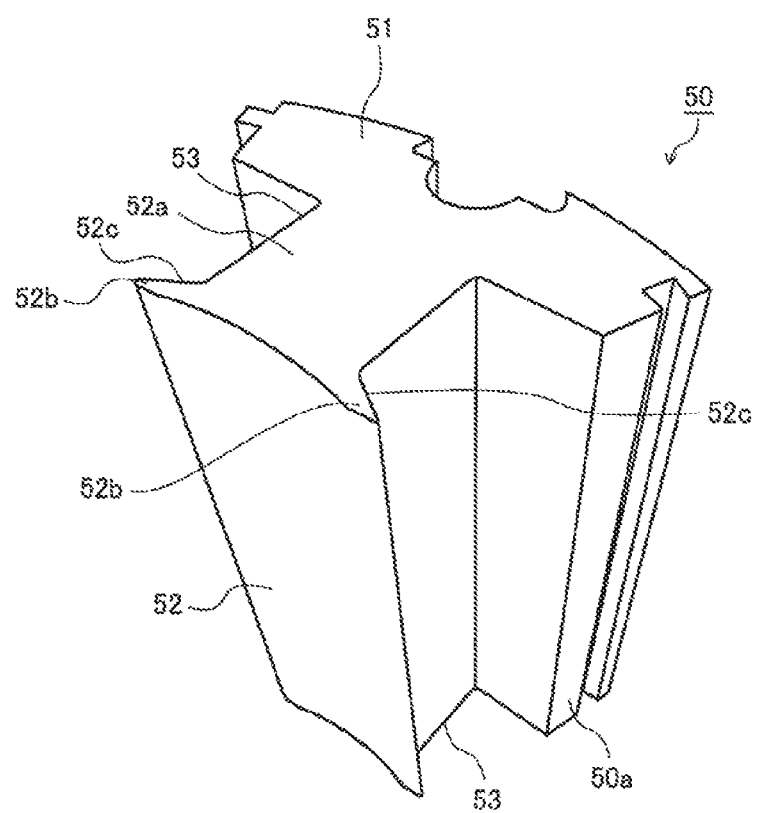
FIG. 3 is a perspective view of an iron core 50 in embodiment 1 of the present invention.

FIG. 3 is a perspective view of an iron core 50 in embodiment 1 of the present invention.

As illustrated in FIG. 2, the stator unit 35 includes a plurality of stators 31 which are connected to each other, and arranged annularly. Roughly speaking, the stators 31 are made up of a plurality of iron cores 50 serving as cores and windings 55 concentratedly wound around the respective iron cores 50.

The iron cores 50 are each formed by stacking a plurality of iron sheets. Each iron core 50 has a substantially T-shaped section, and includes an arc-shaped core-back portion 51 forming an outer periphery of the iron core 50, and a tooth portion 52 projecting from an inner peripheral side of the core-back portion 51 in a direction toward an inner peripheral side of the iron core 50. The tooth portion 52 includes: a tooth base 52a around which a winding 55 is wound, with an upper insulator 60 and a lower insulator 70 interposed between the tooth base 52a and the winding 55; and a pair of tooth tips 52b provided on the inner peripheral side of the iron core 50 and projecting from the tooth base 52a in a circumferential direction. In a horizontal section of the iron core 50, slot portions 53 are defined as depressions by the tooth base 52a, which are narrower than the core-back portion 51 and the tooth tips 52b.

The core-back portions 51 of the plurality of iron cores 50 are coupled to each other in the circumferential direction, and are thus annularly continuous with each other, whereby the stator unit 35 is formed cylindrically. In this state, between any adjacent two of the tooth portions 52, two slot portions 53 are continuous with each other and allow an associated winding 55 to pass through space defined by the slot portions 53. The stator unit 35, which has a cylindrical shape, is provided in the pressure vessel 40 such that the center axis J of the stator unit 35 extends in the Z direction (vertical direction).

[Regarding Upper Insulator 60]

Figure 4:
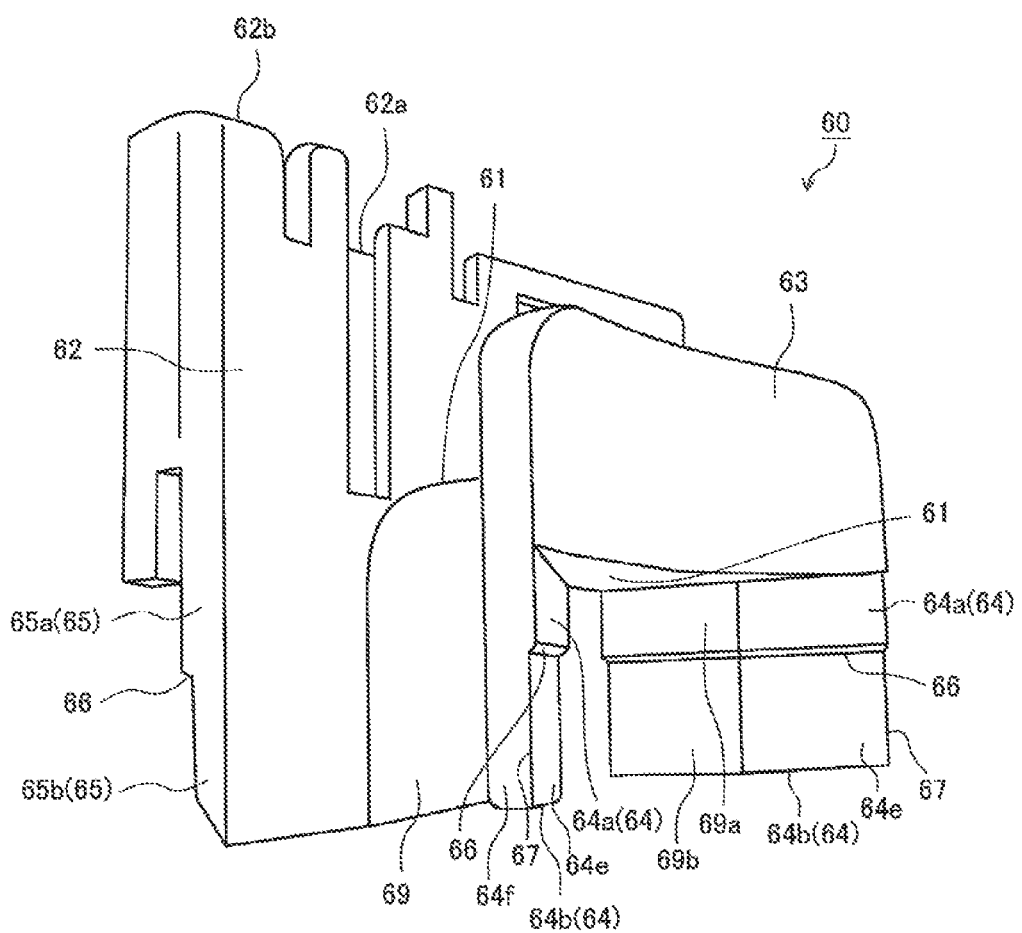
FIG. 4 is a perspective view of an upper insulator 60 in embodiment 1 of the present invention.

FIG. 4 is a perspective view f the upper insulator 60 in embodiment 1 of the present invention.

Figure 5:
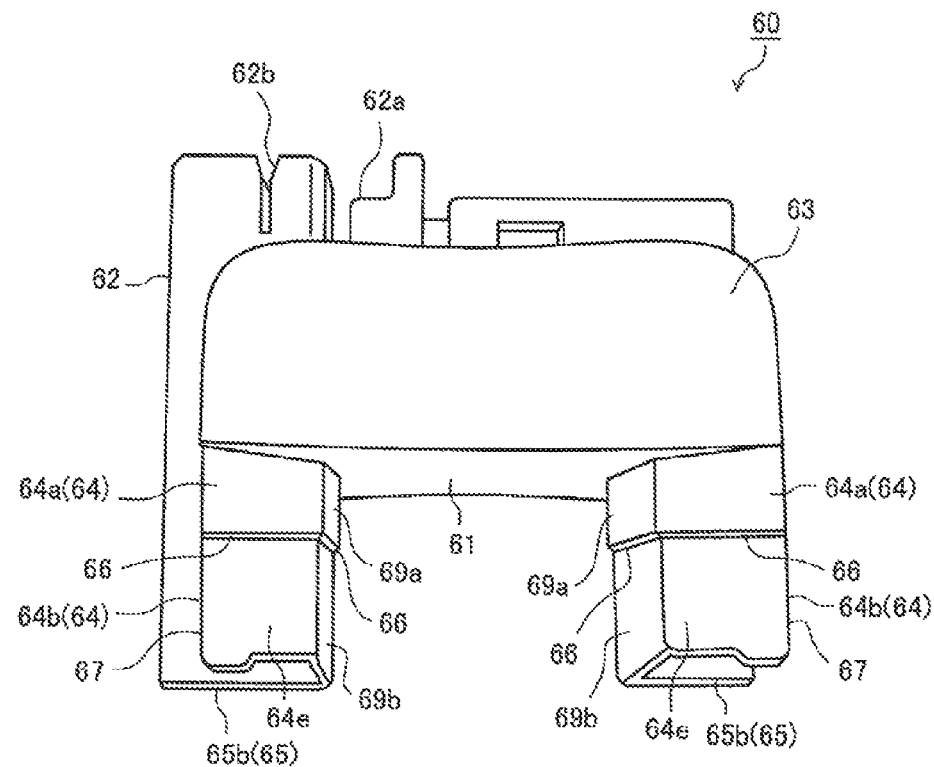
FIG. 5 is another perspective view of the upper insulator 60 in embodiment 1 of the present invention, seen from an inner peripheral side of a stator 31.

FIG. 5 is another perspective view of the upper insulator 60 in embodiment 1 of the present invention, as seen from the inner peripheral side of the stator 31.

The upper insulator 60 is provided at the top of the iron core 50. The upper insulator 60 is formed off polybutylene terephthalate (PBT) to insulate the winding 55 and the iron core 50 from each other.

Roughly speaking, the upper insulator 60 is made up of a base portion 61 around which the winding 55 is wound, an outer peripheral wall 62 provided on the outer peripheral side of the base portion 61, and an inner peripheral wall 63 provided on the inner peripheral side of the base portion 61.

The base portion 61 extends in the horizontal direction, and includes a pair of center legs 69 which extend downwards in the Z direction (the vertical direction) from two respective ends of the base portion 61.

The inner peripheral wall 63 includes, at the bottom thereof, a pair of inner peripheral legs 64 extending in the Z direction (the vertical direction).

The outer peripheral wall 62 includes, at the top thereof, a slot 62a into which a connection terminal is press-fitted, and a winding-holding portion 62b which holds a winding. The outer peripheral wall 62 includes, at the bottom thereof, a pair of outer peripheral legs 65 extending in the Z direction (the vertical direction).

Each of the inner peripheral legs 64, an associated one of the center legs 69, and an associated one of the outer peripheral legs 65 are connected to each other to incline to each other at angles, forming a substantially U-shaped section as view from below. They correspond to the leg in the present invention.

The inner peripheral leg 64 includes first inner peripheral legs 64a and second inner peripheral legs 64b. Between the first inner peripheral legs 64a and the second inner peripheral legs 64b, respective steps are formed. The first inner peripheral legs 64a extend downwards from lower portions of the inner peripheral wall 63. The second inner peripheral legs 64b extend downwards from lower portions of the first inner peripheral legs 64a. The second inner peripheral legs 64b are thinner than the first inner peripheral legs 64a, and step portions 66 are formed to extend in the horizontal direction.

Likewise, the center leg 69 includes first center legs 69a and second center legs 69b. Between the first center legs 69a and the second center legs 69b, respective steps are formed. The first center legs 69a extends downwards from respective ends of the base portion 61. The second centers leg 69b extends downwards from lower portions of the first center legs 69a. The second center legs 69b are thinner than the first center legs 69a, and step portions 66 are formed to extend in the horizontal direction.

The outer peripheral leg 65 includes first outer peripheral legs 65a and second outer peripheral legs 65b. Between the first outer peripheral legs 65a and the second outer peripheral legs 65b, respective steps are formed. The second outer peripheral legs 65b extend downward from lower portions of the first outer peripheral legs 65a. The second outer peripheral legs 65b are thinner than the first outer peripheral legs 65a, and step portions 66 are formed to extend in the horizontal direction.

The step portions 66 continuously extend along the inner peripheral leg 64, the center leg 69 and the outer peripheral leg 65 in the horizontal direction. Therefore, the second inner peripheral legs 64b, the second center legs 69b and the second outer peripheral legs 65b (corresponding to first legs according to the present invention) are U-shaped to extend from the first inner peripheral legs 64a, the first center legs 69a and the first outer peripheral legs 65a (corresponding to second legs according to the present invention).

The windings 55 are connected to the lead lines, with respective connection terminals interposed between them, and are connected to associated ones of power supply terminals for U, V and W phases. U-phase, V-phase and W-phase elements are electrically connected to each other by jumper wires.

[Regarding Lower Insulator 70]

Figure 6:
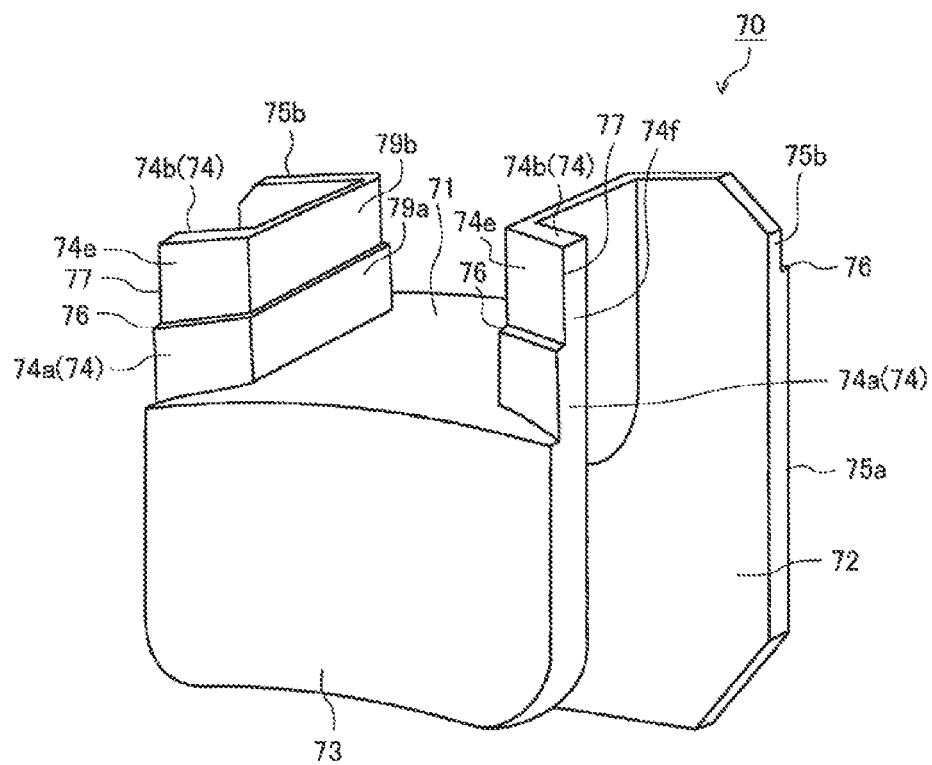
FIG. 6 is a perspective view of a lower insulator 70 in embodiment 1 of the present invention.

FIG. 6 is a perspective view illustrating the lower insulator 70 in embodiment 1 of the present invention.

Figure 7:
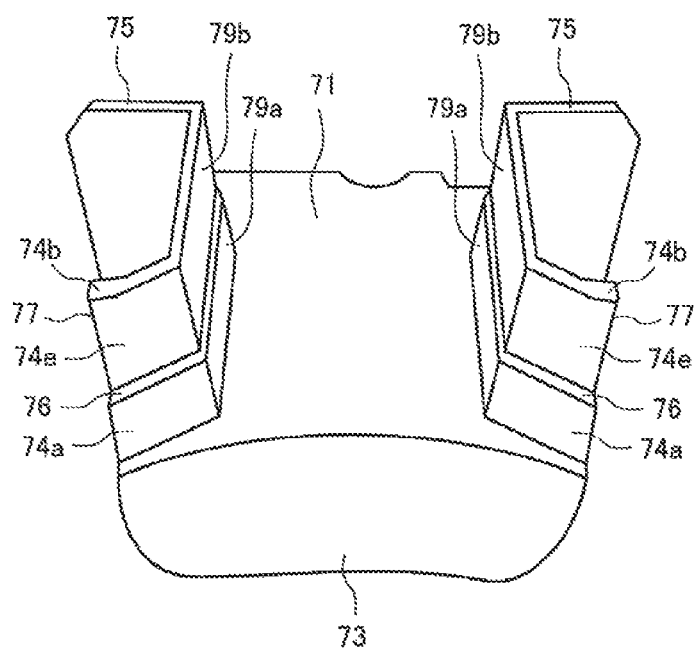
FIG. 7 is another perspective view of the lower insulator 70 in embodiment 1 of the present invention, seen from the inner peripheral side of the stator 31.

FIG. 7 is another perspective view of the lower insulator 70 in embodiment 1 of the present invention, as seen from the inner peripheral side of the stator 31.

The lower insulator 70 is an element provided at the lower portion of the iron core 50. The lower insulator 70 is made of polybutylene terephthalate (PBT) to insulate the winding 55 and the iron core 50 from each other.

The lower insulator 70 roughly includes a base portion 71 around which the winding 55 is wound, an outer peripheral wall 72 provided on the outer peripheral side of the base portion 71, and an inner peripheral wall 73 provided on the inner peripheral side of the base portion 71.

The base portion 71 extends in the horizontal direction, and includes a pair of center legs 79 extending in the Z direction (the vertical direction) from respective ends of the base portion 71.

The inner peripheral wall 73 includes at an upper portion thereof a pair of inner peripheral legs 74 extending in the Z direction (the vertical direction).

The outer peripheral wall 72 has at an upper portion thereof a pair of outer peripheral legs 75 extending in the Z direction (the vertical direction).

The inner peripheral legs 74, the center legs 79 and the outer peripheral legs 75 are connected to incline to each other at angles, as seen in top view, and are continuous with each other to have a substantially U-shaped section. The set of the inner peripheral leg 74, the center leg 79, and the outer peripheral leg 75 corresponds to the leg according to the present invention.

The inner peripheral leg 74 includes first inner peripheral legs 74a and second inner peripheral legs 74b. Between the first inner peripheral legs 74a and the second inner peripheral legs 74b, respective steps are formed. The first inner peripheral legs 74a extends upwards from an upper portion of the inner peripheral wall 73. The second inner peripheral legs 74b extend upwards from upper portions of the first inner peripheral legs 74a. The second inner peripheral legs 74b are thinner than the first inner peripheral legs 74a, and step portions 76 are formed to extend in the horizontal direction.

Likewise, the center leg 79 includes first center legs 79a and second center legs 79b. Between the first center legs 79a and the second center legs 79b, respective steps are formed. The first center legs 79a extend upwards from two respective ends of the base portion 71. The second center legs 79b extend upwards from upper portions of the first center legs 79a. The second center legs 79b are thinner than the first center legs 79a, and step portions 76 are formed to extend in the horizontal direction.

The outer peripheral leg 75 includes first outer peripheral legs 75a and second outer peripheral legs 75b. Between the first outer peripheral legs 75a and the second outer peripheral legs 75b, respective steps are formed. The second outer peripheral legs 75b extend upwards from upper portions of the first outer peripheral legs 75a. The second outer peripheral legs 75b are thinner than the first outer peripheral legs 75a, and step portions 76 are formed to extend in the horizontal direction.

The step portions 76 continuously extend along the inner peripheral leg 74, the center leg 79 and the outer peripheral leg 75 in the horizontal direction.

[Regarding Insulating Film 80]

Figure 8:
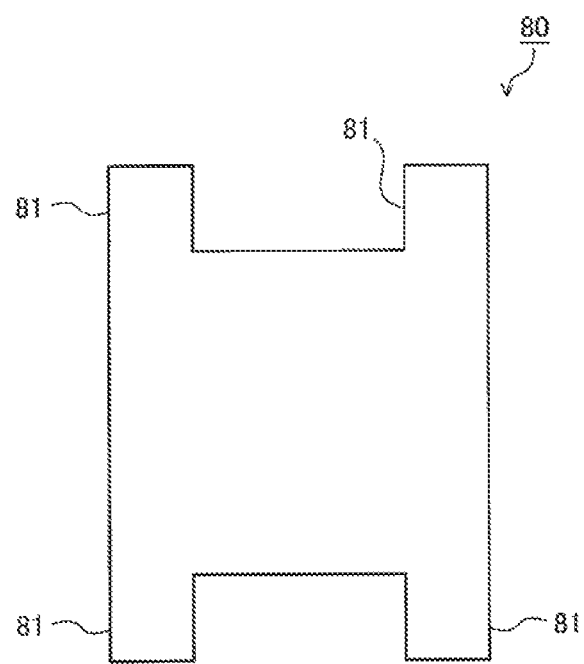
FIG. 8 is a plan view of an insulating film 80 in embodiment 1 of the present invention.

FIG. 8 is a plan view of an insulating film 80 in embodiment 1 of the present invention.

As illustrated in FIG. 8, the insulating film 80 is a substantially rectangular thin film and includes four projecting portions 81 provided at four respective corners thereof. The insulating film 80 also includes a pair of engagement side portions 82 each provided between associated two of the projecting portions 81. The insulating film 80 is held between the upper insulator 60 and the lower insulator 70 and is thus fixed to the iron core 50. The insulating film 80 is made of, for example, polyethylene terephthalate (PET) having a thickness of 0.25 mm to insulate the winding 55 and the iron core 50 from each other.

[Configuration of Stator 31]

Figure 9:
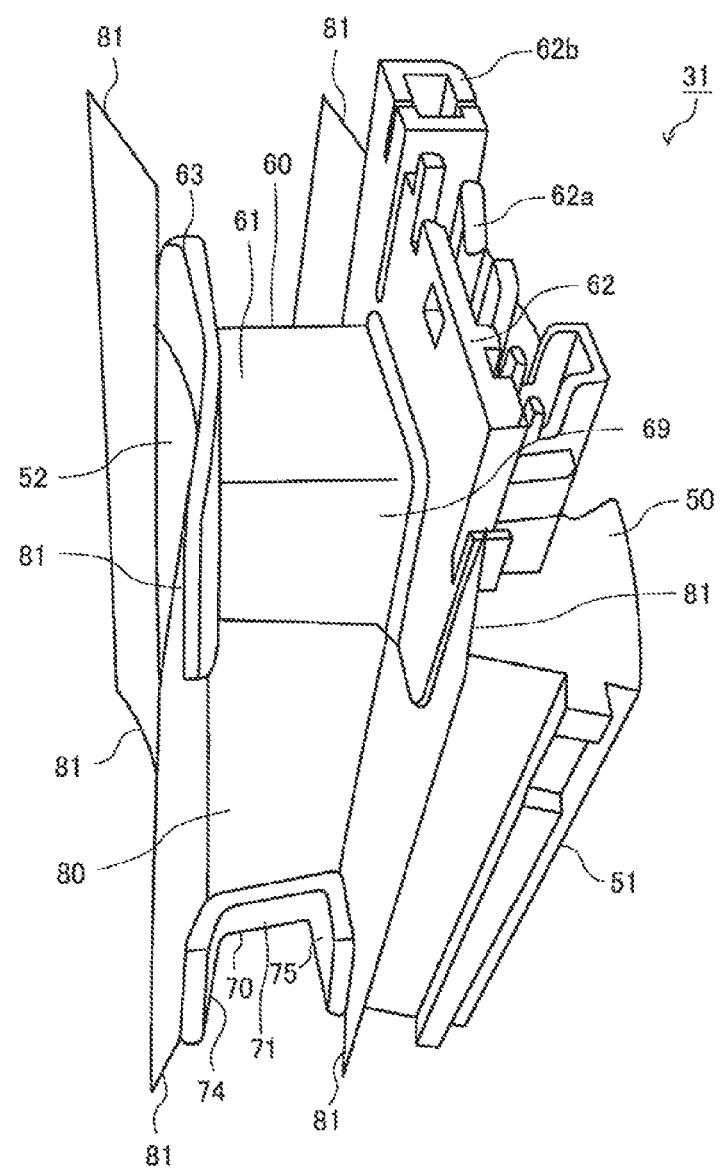
FIG. 9 is a perspective view of the stator 31 in embodiment 1 of the present invention, with a winding 55 removed.

FIG. 9 is a perspective view of the stator 31 in embodiment 1 of the present invention, with the winding 55 removed.

Figure 10:
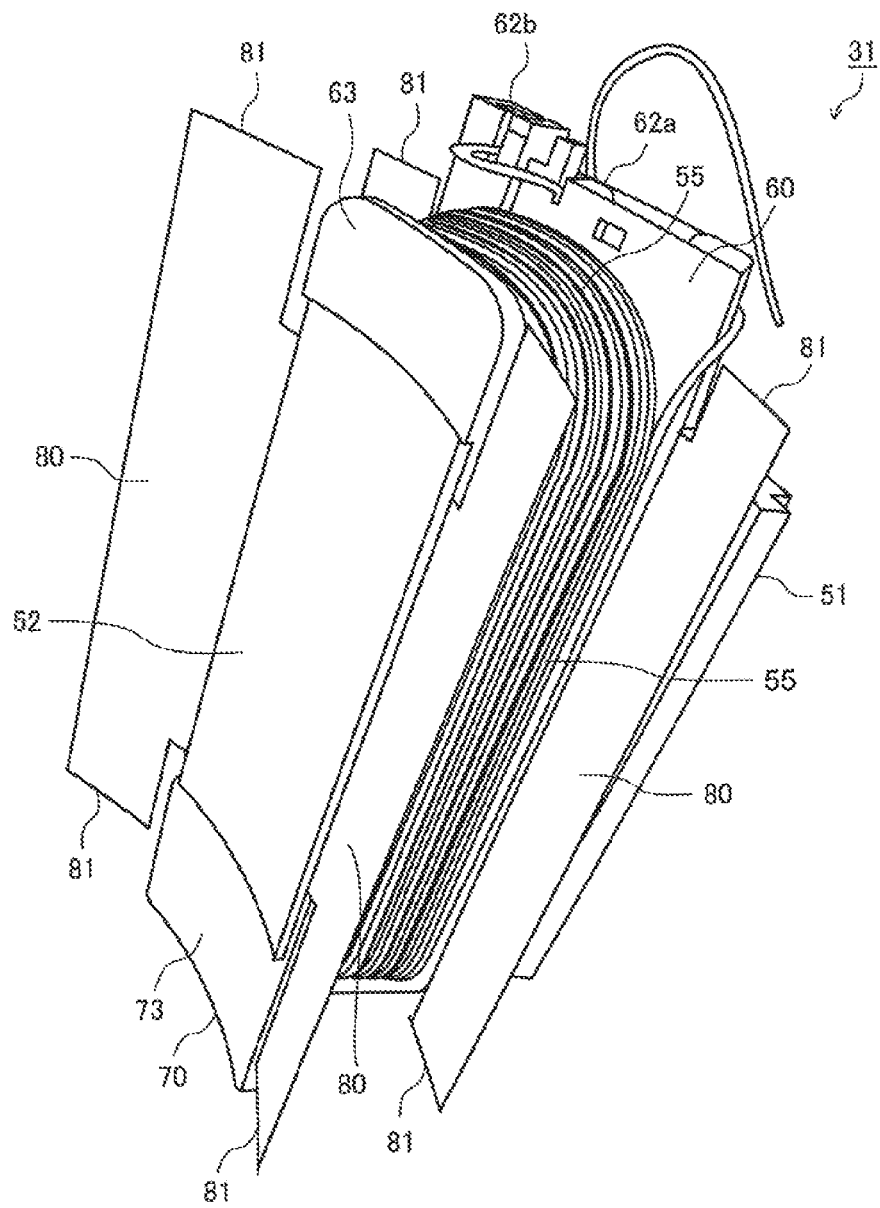
FIG. 10 is another perspective view of the stator 31 in embodiment 1 of the present invention.

FIG. 10 is another perspective view of the stator 31 in embodiment 1 of the present invention.

Figure 11:
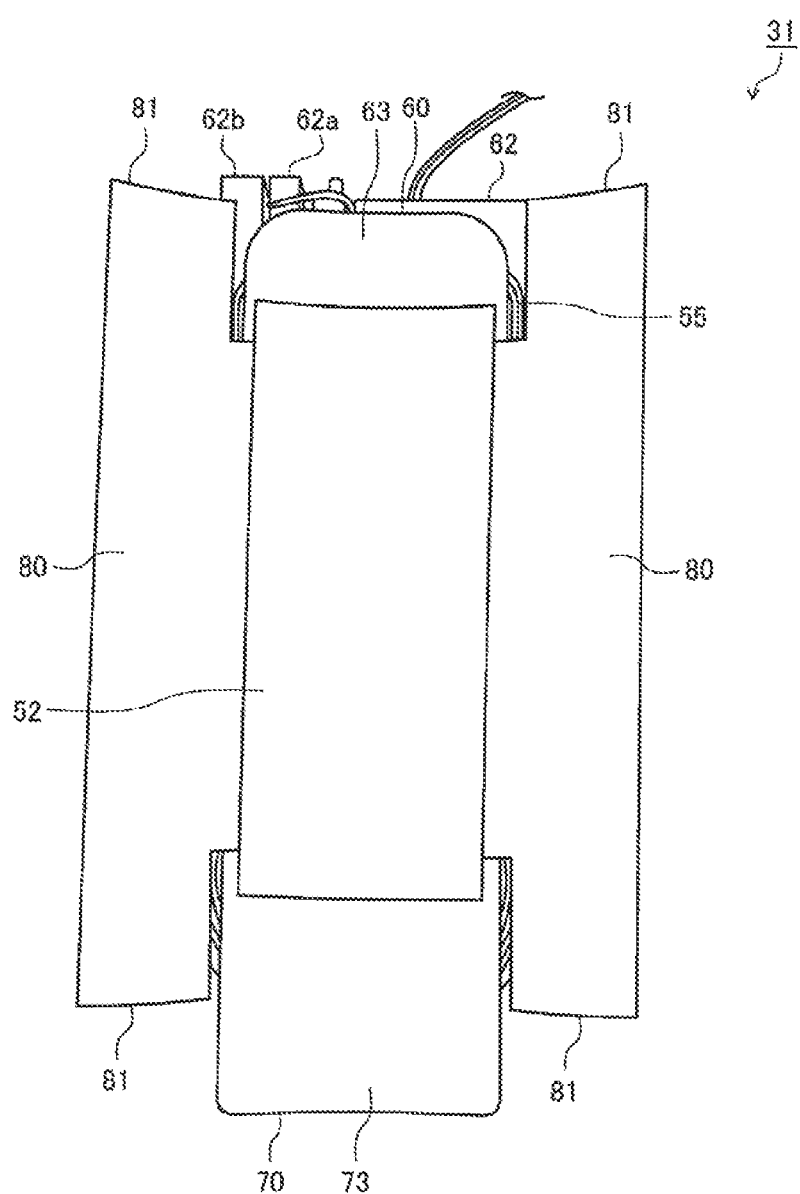
FIG. 11 is a plan view of the stator 31 in embodiment 1 of the present invention, seen from the inner peripheral side.

FIG. 11 is a plan view of the stator 31 in embodiment 1 of the present invention, seen from the inner peripheral side.

Figure 12:
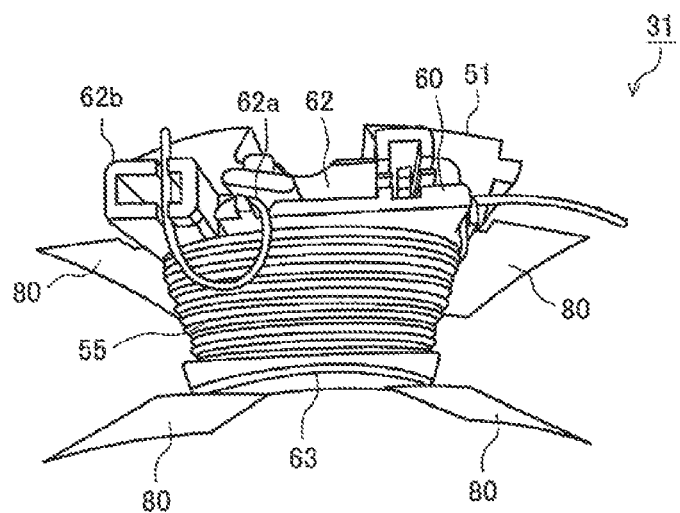
FIG. 12 is a top view of the stator 31 in embodiment 1 of the present invention, seen from the upper side.

FIG. 12 is a top view of the stator 31 in embodiment 1 of the present invention, seen from the upper side.

As illustrated in FIGS. 9 to 12, the stator 31 includes the iron core 50, the upper insulator 60, the lower insulator 70 and two insulating films 80.

The upper insulator 60 is attached to an upper portion of the iron core 50. The lower insulator 70 is attached to a lower portion of the iron core 50.

When the upper insulator 60 is attached to the iron core 50, the center legs 69, the inner peripheral legs 64 and the outer peripheral legs 65 of the upper insulator 60 are engaged with respective slot portions 53 of the iron core 50.

When the lower insulator 70 is attached to the iron core 50, the center legs 69, the inner peripheral legs 74 and the outer peripheral legs 75 of the lower insulator 70 are engaged with respective slot portions 53 of the iron core 50.

In the above case, the tooth tips 52b come into contact with the first inner peripheral legs 64a of the upper insulator 60 and with the first inner peripheral legs 74a of the lower insulator 70.

The insulating film 80 is fixed such that one of the engagement side portions 82 is held between the iron core 50 and the upper insulator 60. Furthermore, the insulating film 80 is fixed such that the other of the engagement side portions 82 is held between the iron core 50 and the lower insulator 70.

Thus, referring to FIGS. 10 and 11, two insulating films 80 as illustrated therein are held such that four end portions thereof extend from the tooth portion 52 in the horizontal direction.

Thus, upper and lower surfaces of the tooth portion 52 of the iron core 50 are covered by the upper insulator 60 and the lower insulator 70, and two side surfaces of the tooth portion 52 are covered by the insulating films 80. Thus, the tooth portion 52 is completely insulated from the winding 55.

The sectional configuration of the stators 31 will be described.

Figure 13:
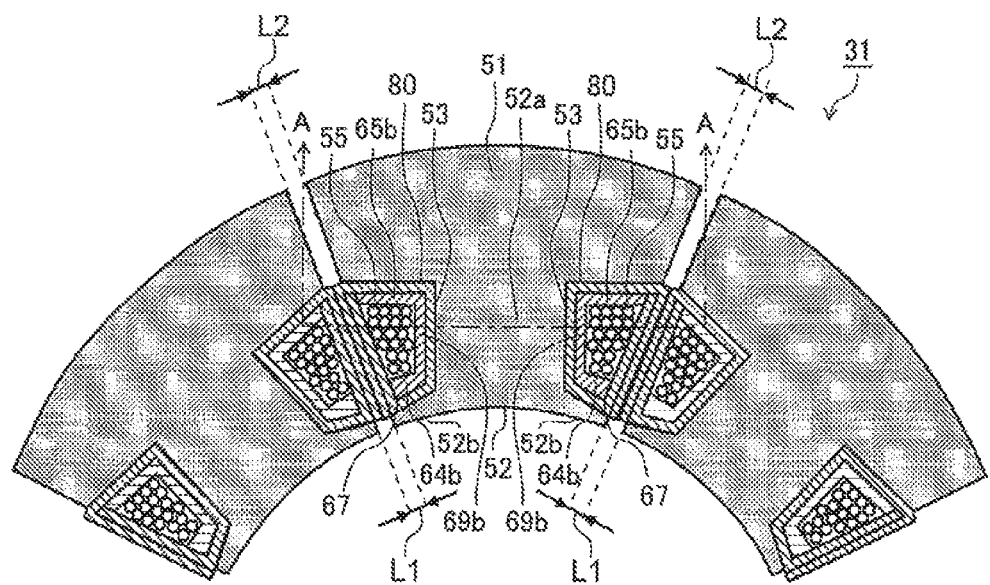
FIG. 13 is a horizontal sectional view (section taken line B-B in FIG. 14) of the stator 31 in embodiment 1 of the present invention.

FIG. 13 is a horizontal sectional view (section taken along line B-B in FIG. 14) of the stator 31 in embodiment 1 of the present invention.

Figure 14:
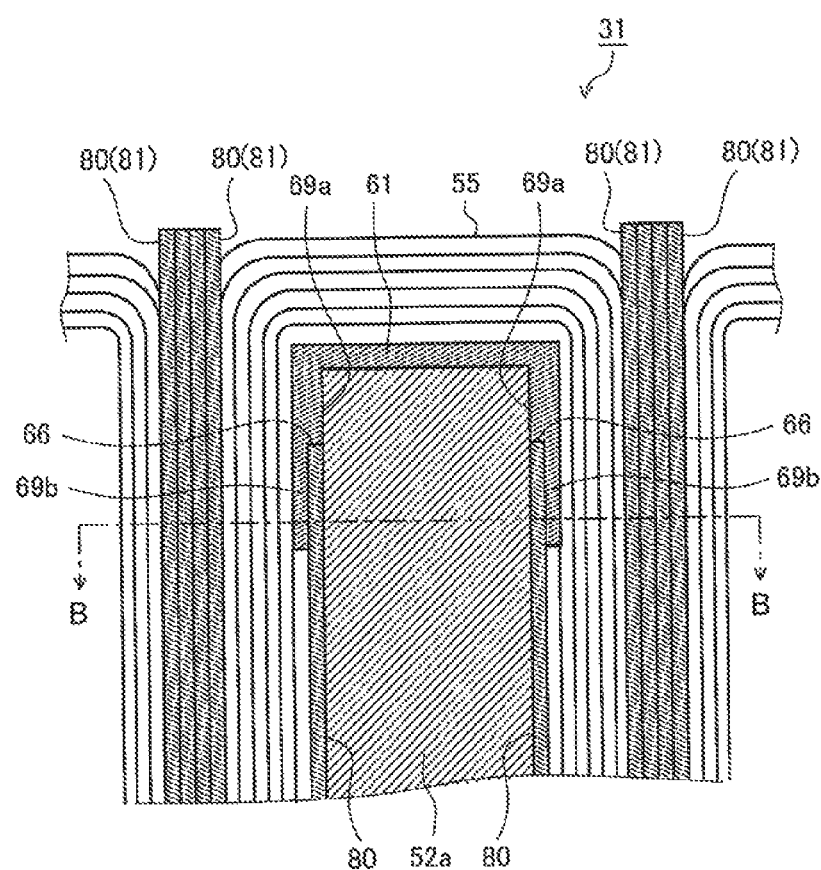
FIG. 14 is a vertical sectional view (section taken line A-A in FIG. 13) of the stator 31 in embodiment 1 of the present invention.

FIG. 14 is a vertical sectional view (section taken along line A-A in FIG. 13) of the stator 31 in embodiment 1 of the present invention.

In the stator 31, the iron core 50 and the upper insulator 60 are fixed to each other, with the center legs 69, the inner peripheral legs 64 and the outer peripheral legs 65 of the upper insulator 60 engaged with the respective slot portions 53 of the iron core 50. In the horizontal section as illustrated in FIG. 13, the insulating films 80 are provided in the respective slot portions 53 of the iron core 50. The insulating films 80 are each fixedly held between an associated one of the slot portions 53 and an associated one of the second center legs 69b, an associated one of the second inner peripheral legs 64b, and an associated one of the second outer peripheral legs 65b of the upper insulator 60.

In the vertical section as illustrated in FIG. 14, each insulating film 80 has a thickness equivalent to the size of the step portion 66, which is formed because of the thickness difference between the first center leg 69a and the second center leg 69b. The step portion 66 also extend continuous with the inner peripheral leg 64 and the outer peripheral leg 65. Thus, the insulating film 80 is fitted between the slot portion 53 of the iron core 50 and the second center leg 69b, the second inner peripheral leg 64b and the second outer peripheral leg 65b of the upper insulator 60, with no space between them.

Furthermore, in the insulating film 80, projecting portions 81 are formed. Thus, as illustrated in FIG. 14, the insulating film 80 extends upwards beyond the winding 55 as illustrated in FIG. 14. Therefore, the insulating film 80 can prevent the windings 55 of adjacent ones of the stators 31 from coming into contact with each other.

The insulating film 80 is flexible, and as illustrated in FIG. 13, is folded along the slot portion 53 of the iron core 50, and is accommodated therein. Furthermore, four insulating films 80 are crimped and provided in respective gaps between adjacent ones of the iron cores 50. In this case, the stator unit 35 is configured such that the relationship "L1=4×t" is satisfied, where L1 is the distance between adjacent ones of the inner peripheral legs 64, and t is the thickness of each insulating film 80. Furthermore, the stator unit 35 is configured such that the relationship "L2=4×t" is satisfied, where L2 is the distance between adjacent ones of the outer peripheral legs 65, and t is the thickness of each insulating film 80.

Although the above description is made by referring to by way of example a configuration for fixing the insulating film 80 using the upper insulator 60, the configuration is also applied to fixation of the insulating film 80 to the iron core 50 using the lower insulator 70.

The sections of the inner peripheral legs 64 and 74 of the upper insulator 60 and the lower insulator 70 will be described.

Figure 15:
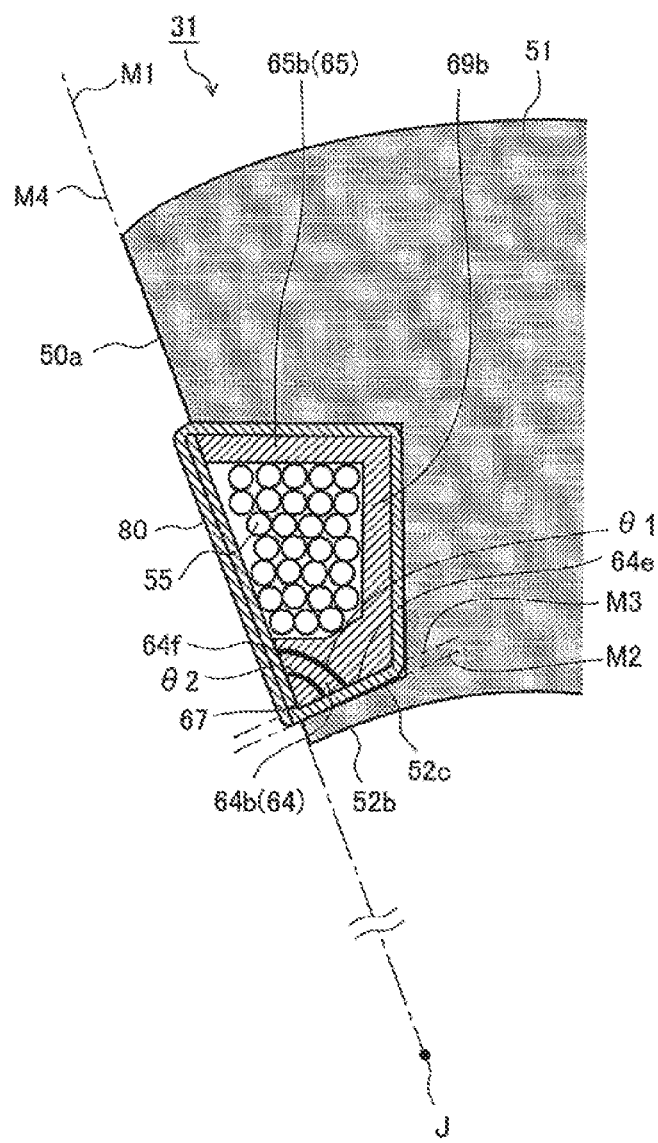
FIG. 15 is an enlarged view of the vicinity of a slot portion as illustrated in FIG. 13.

FIG. 15 is an enlarged view of the vicinity of the slot portion as illustrated in FIG. 13.

As illustrated in FIG. 15, θ1 denotes an angle formed between a first virtual plane M1 extending along a second side surface 50a of the iron core 50 in a direction toward a peripheral side thereof and a second virtual plane M2 extending along an outer peripheral surface 52c of the tooth tip 52b that is located on the outer peripheral side. Furthermore, θ2 denotes an angle formed between a third virtual plane M3 extending along an inner peripheral surface 64e of the inner peripheral leg 64 of the upper insulator 60 and a fourth virtual plane M4 extending along a first side surface 64f of the inner peripheral leg 64 in the direction toward the peripheral side. The first virtual plane M1 is a virtual plane passing through a center axis J of the stator unit 35.

It should be noted that the line of intersection of the inner peripheral surface 64e and the first side surface 64f of the inner peripheral leg 64 will be referred to as a folding ridge 67 which is a group of supports at which the insulating film 80 is folded, and the above angle θ2 will be referred to as folding-ridge angle θ2.

The above angle θ1 will be denoted as tooth-tip angle θ1.

In the above case, the outer peripheral surface 52c on the outer peripheral side of the tooth tip 52b and the inner peripheral surface 64e and the first side surface 64f of the inner peripheral leg 64 of the upper insulator 60 are formed such that the difference between the angles θ1 and θ2 is 5 degrees or smaller (preferably, θ1=θ2).

For example, in the case where θ1=θ2, if the second virtual plane M2 and the third virtual plane M3 are parallel to each other, the first virtual plane M1 and the fourth virtual plane M4 are also parallel to each other.

The insulating film 80 is folded at the folding ridge 67. One side of the insulating film 80 is held between the tooth tip 52b and the second inner peripheral leg 64b, and the other side of the insulating film 80 is held between the tooth tip 52b and the insulating film 80 of the stator 31 located adjacent to the second inner peripheral leg 64b.

In the insulating film 80 having the above configuration, in the case where the folding-ridge angle θ2 is made greater than the tooth-tip angle θ1, a repulsive force generated by bending the insulating film 80 is weak. As a result, the gap between the inner peripheral leg 64 of the upper insulator 60 and the insulating film 80 is decreased. However, adjacent ones of the inner peripheral legs 64 interfere with each other. Consequently, the stators 31 cannot be arranged annularly.

In contrast, in the case where the folding-ridge angle θ2 is made smaller than the tooth-tip angle θ1, the repulsive force generated by bending the insulating film 80 is strong. As a result, the gap between the inner peripheral leg 64 of the upper insulator 60 and the outer peripheral surface 52c of the tooth tip 52b is increased. Therefore, a gap is provided around the insulating film 80.

In view of the above, in the present invention, the difference between the folding-ridge angle θ2 and the tooth-tip angle θ1 is set to 5 degrees or smaller (preferably, θ1=θ2), in order that no gap be provided between the inner peripheral leg 64 of the upper insulator 60 and the insulating film 80.

It should be noted that in the case where a distal end of the folding ridge 67 is made round, if the curvature radius r of the distal end of the folding ridge 67 is made equal to the thickness t of the insulating film 80 (r=t), a gap is not easily provided between the folding ridge 67 and the insulating film 80.

Although it is described above that the distance L between adjacent ones of the inner peripheral legs 64 in the stator unit 35 is four times the thickness t of the insulating film 80, the distance may be less than four times the thickness t, for example, 1.6 times the thickness t of the insulating film 80. If the distance L1 between adjacent ones of the inner peripheral legs 64 and the distance L2 between adjacent ones of the outer peripheral legs 65 are made small to squash the insulating films 80, the gap between the upper insulator 60 or the lower insulator 70 and the insulating film 80 can be made small to further reduce the degree of deposition or stay of foreign substances.

The distance L between adjacent ones of the inner peripheral legs 64 may be defined as the distance between adjacent ones of the folding ridges 67.

Although the configuration for fixing the insulating film 80 using the upper insulator 60 is described above by way of example, the same configuration or a similar configuration to the above configuration is also applied to fixation of the insulating film 80 to the iron core 50 using the lower insulator 70.

Now, the appearance of the insulating films 80 in the case where adjacent ones of the stators 31 are assembled into the stator unit 35 will be described.

Figure 16:
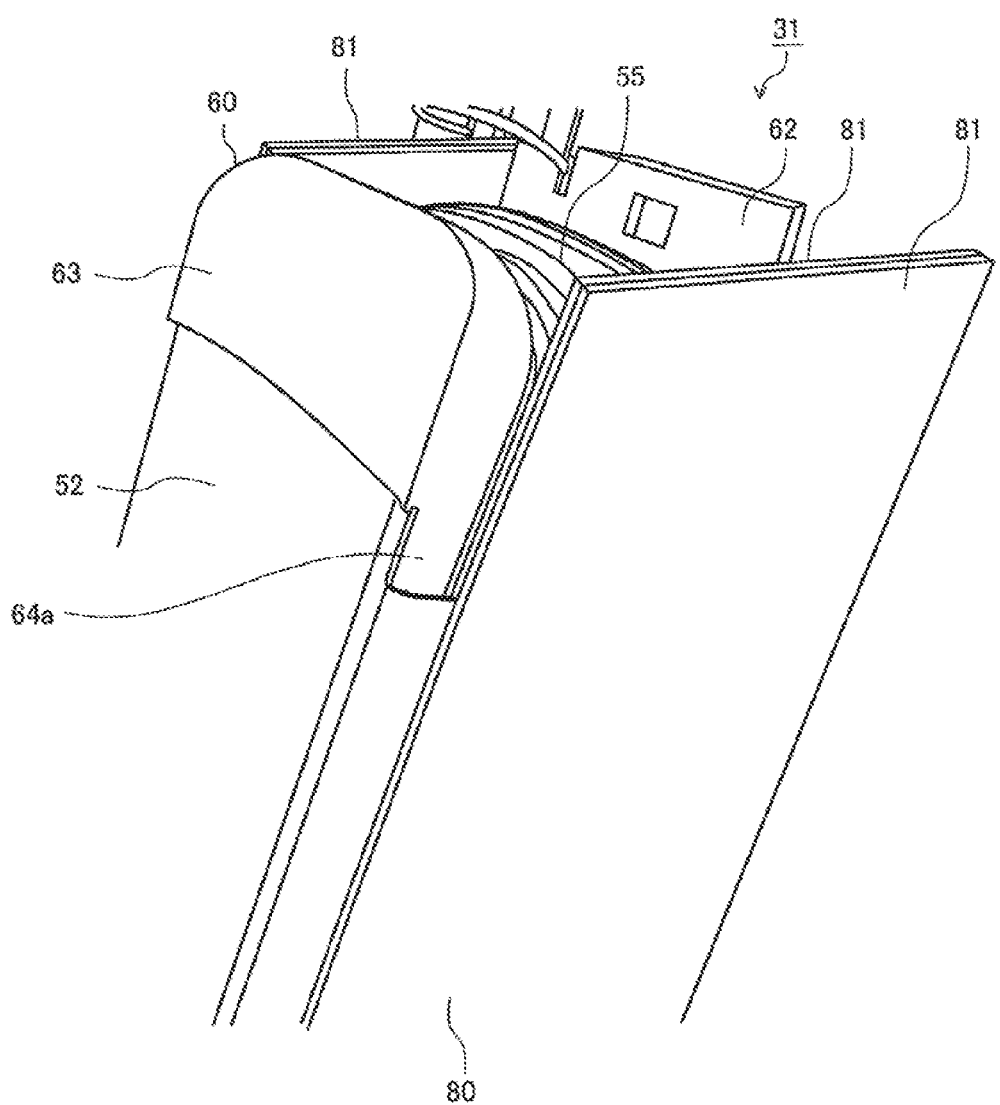
FIG. 16 is a perspective view of a stator 31 assembled into the stator unit 35 in embodiment 1 of the present invention.

FIG. 16 is a perspective view of a stator 31 assembled into the stator unit 35 in embodiment 1 of the present invention.

Figure 17:
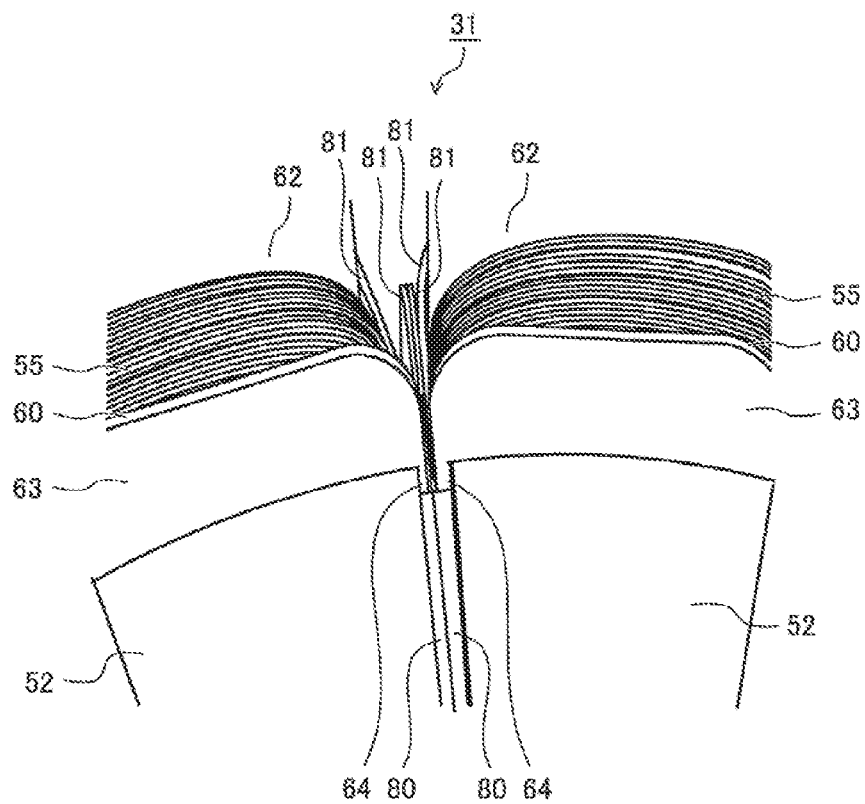
FIG. 17 is a perspective view of stators 31 assembled into the stator unit 35 in embodiment 1 of the present invention, seen from the inner peripheral side.

FIG. 17 is a perspective view of stators 31 assembled into the stator unit 35 in embodiment 1 of the present invention, as seen from an inner peripheral side.

Figure 18:
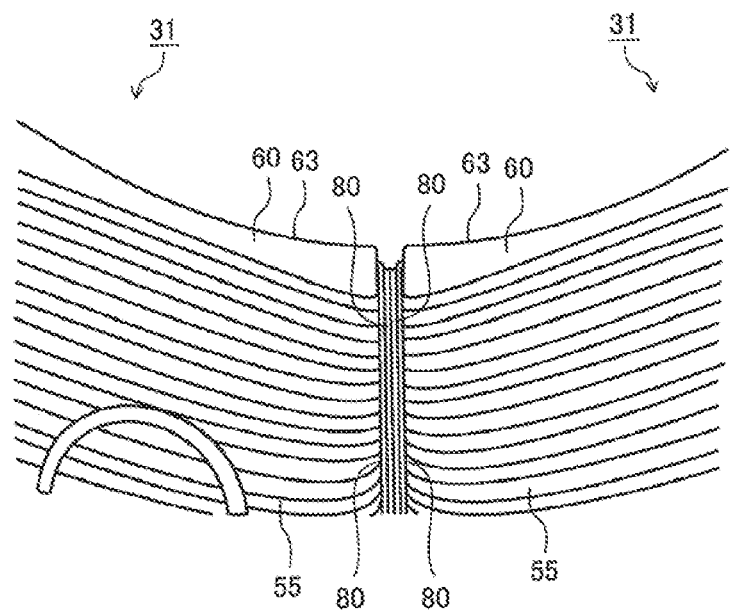
FIG. 18 is a top view of the stators 31 assembled into the stator unit 35 in embodiment 1 of the present invention.

FIG. 18 is a top view of the stators 31 assembled into the stator unit 35 in embodiment 1 of the present invention.

In the case where the stators 31 are assembled into the stator unit 35, as illustrated in FIGS. 16 to 18, each insulating film 80 is folded from the inner peripheral side of the stator unit 35 toward the outer peripheral side thereof at the inner peripheral legs 64 of the upper insulator 60, which serves as a fulcrum. Four layers of the insulating films 80 provided at adjacent ones of the stators 31 are stacked, and held between associated ones of the windings 55, thereby insulating those windings 55 from each other.

As described above, since the gap between the upper insulator 60 and the insulating film 80 and the gap between the lower insulator 70 and the insulating film 80 are small, the degree of deposition or stay of foreign substances in the gaps can be reduced. In particular, no gaps are provided on an inner peripheral side of each of the upper insulator 60 and the lower insulator 70, that is closer to the rotor 32, and between the insulating film 80 and each of the inner peripheral legs 64 and 74. Thus, foreign substances such as iron powder that fly off toward the stator unit 35 with the rotation of the rotor 32 do not deposit or stay. Therefore, the iron cores 50 and the windings 55 can be kept insulated from each other by an appropriate distance. Accordingly, a highly reliable electric motor can be obtained.

The electric motor according to embodiment 1 includes:

(1) the stator unit 35 in which the plurality of stators 31 including the respective iron cores 50 each made of a magnetic body are arranged in an annular shape; the insulators provided at the respective ends of the iron cores 50 in the axial direction of the stator unit 35; the windings 55 wound around the respective insulators; and the insulating films 80 insulating the iron cores 50 and the winding 55 from each other. The insulating films 80 are fixed between the iron cores 50 and the insulators.

In the electric motor configured as described above, the insulating films 80 can be fixed between the irons cores 50 and the insulators with no gap. It is therefore possible to prevent deposition or stay of foreign substances since no gap is present, and insulate the iron cores 50 and the windings 55 from each other by an appropriate distance. Thus, a highly reliable electric motor can be obtained.

In the electric motor according to embodiment 1, (2) the iron cores 50 include the respective groove-shaped slot portions 53 with which the insulators are engaged, with the insulating films 80 interposed between the groove-shaped slot portions 53 and the insulators. The insulators include the respective base portions 61 and 71 around which the windings 55 are wound, and the legs which are engaged with the slot portions 53, with the insulating films 80 interposed between the legs and the slot portions 53.

In the electric motor according to embodiment 1, (3) the legs have respective recesses with which the insulating films 80 are in contact.

In the electric motor according to embodiment 1, (4) the legs include the respective first legs with which the iron cores 50 are in contact, and the respective second legs with which the insulating films 80 are in contact, and the second legs are thinner than the first legs.

In the electric motor according to embodiment 1, (5) the thickness difference between each of the first legs and an associated one of the second legs is equal to the thickness of each of the insulating films 80.

In the electric motor according to embodiment 1, (6) the legs include the respective inner peripheral legs 64 and 74 provided on the inner peripheral side of the stator unit 35, the respective outer peripheral legs 65 and 75 provided on the outer peripheral side of the stator unit 35, and the respective center legs 69 and 79 connecting respective one-end sides of the inner peripheral legs 64 and 74 and respective one-end sides of the outer peripheral legs 65 and 75 to each other. The inner peripheral legs 64, the center legs 69 and the outer peripheral legs 65 are continuous with each other to form U-shaped sections, and the inner peripheral legs 74, the center legs 79 and the outer peripheral legs 75 are continuous with each other to form U-shaped sections.

In such a manner, the insulators are formed to have the legs, and the insulating films 80 are thus fitted, with no gap, between the legs of the insulators and the slot portions 53 of the iron cores 50. It is therefore possible to prevent deposition or stay of foreign substances since no gap is present, and insulate the windings 55 from the iron cores 50 at an appropriate distance. Therefore, a highly reliable electric motor can be obtained.

In the electric motor according to embodiment 1, (7) the inner peripheral legs 64 and 74 have the respective inner peripheral surfaces 64e and 74e provided on the inner peripheral side of the stator unit 35, and the respective first side surfaces 64f and 74f formed in the direction toward the peripheral side of the stator unit 35. The iron cores 50 include the respective arc-shaped core-back portions 51, the respective tooth portions 52 provided at the inner peripheral sides of the core-back portions 51, and the respective tooth tips 52b which are provided on the tooth portions 52 and with which the inner peripheral legs 64 and 74 are engaged. The tooth tips 52b each have the outer peripheral surface 52c provided on the outer peripheral side of the stator unit 35. The core-back portions 51 have the second side surface 50a formed in the direction toward the peripheral side of the stator unit 35, and the difference between angles θ1 and θ2 is 5 degrees or smaller, where θ1 is the angle between the outer peripheral surface 52c of the tooth tip 52b and the second side surface 50a of the core-back portion 51, and θ2 is the angle between the inner peripheral surface 64e or 74e and the first side surface 64f or 74f of each of the inner peripheral legs 64 or 74.

In the electric motor according to embodiment 1, (8) the inner peripheral legs 64 and 74 have the respective inner peripheral surfaces 64e and 74e provided on the inner peripheral side of the stator unit 35, and the first side surfaces 64f and 74f provided in the direction toward the peripheral side of the stator unit 35. The iron cores 50 include the respective arc-shaped core-back portions 51, the respective tooth portions 52 provided on the inner peripheral sides of the core-back portions 51, and the respective tooth tips 52b which are provided on the tooth portions 52 and with which the inner peripheral legs 64 and 74 are engaged. The tooth tips 52b each have the outer peripheral surface 52c provided on the outer peripheral side of the stator unit 35. The core-back portions 51 have the respective second side surfaces 50a provided in the peripheral direction of the stator unit 35, and the values of θ1 and θ2 are equal to each other, where θ1 is the angle between the outer peripheral surface 52c of each of the tooth tips 52b and the second side surface 50a of an associated one of the core-back portions 51, and θ2 is the angle between the inner peripheral surface 64e or 74e and the first side surface 64f or 74f of each of the inner peripheral legs 64 or 74.

By virtue of the above configuration of each of the stators 31, the gaps between the insulating films 80 and the inner peripheral legs 64 and 74 of the insulator can be made far smaller. Thus, the degree of deposition or stay of foreign substances in the gaps is reduced, and the iron cores 50 and the windings 55 can be insulated from each other by an appropriate distance. Therefore, an electric motor having a high reliability can be obtained.

In the electric motor according to embodiment 1, (9) the distance between the insulators provided on adjacent ones of the plurality of stators 31 is four times the thickness of each of the insulating films 80.

In the electric motor according to embodiment 1,

(10) the distance between the insulators provided on adjacent ones of the plurality of stators 31 is smaller than four times the thickness of each of the insulating films 80.

In each of the above configurations, the two insulating films 80 can be provided between adjacent ones of the insulators with no gap. It is therefore possible to prevent deposition or stay of foreign substances since no gap is present, and insulate the iron cores 50 and the windings 55 from each other by an appropriate distance. As a result, an electric motor having a high reliability can be obtained.

In the electric motor according to embodiment 1,

(11) the insulating films 80 each include the projecting portions 81 at the two respective ends thereof in the direction toward the peripheral side of the stator unit 35, the projecting portions 81 each projecting in the axial direction.

In the above configuration, the insulating films 80 extends in the axial direction of the stator unit 35 and can therefore prevent adjacent ones of the windings 55 from coming into contact with each other. Thus, an appropriate insulation distance can be provided.

The compressor 100 according to embodiment 1 is provided with the electric motor as described in any of (1) to (11).

Therefore, the iron cores 50 and the windings 55 of the electric motor can be insulated from each other by an appropriate distance, and a compressor 100 having a high reliability can be obtained.

Embodiment 2

An electric motor according to embodiment 2 is basically the same as the electric motor according to embodiment 1, except for the configurations of the upper insulator 60 and the lower insulator 70.

Figure 19:
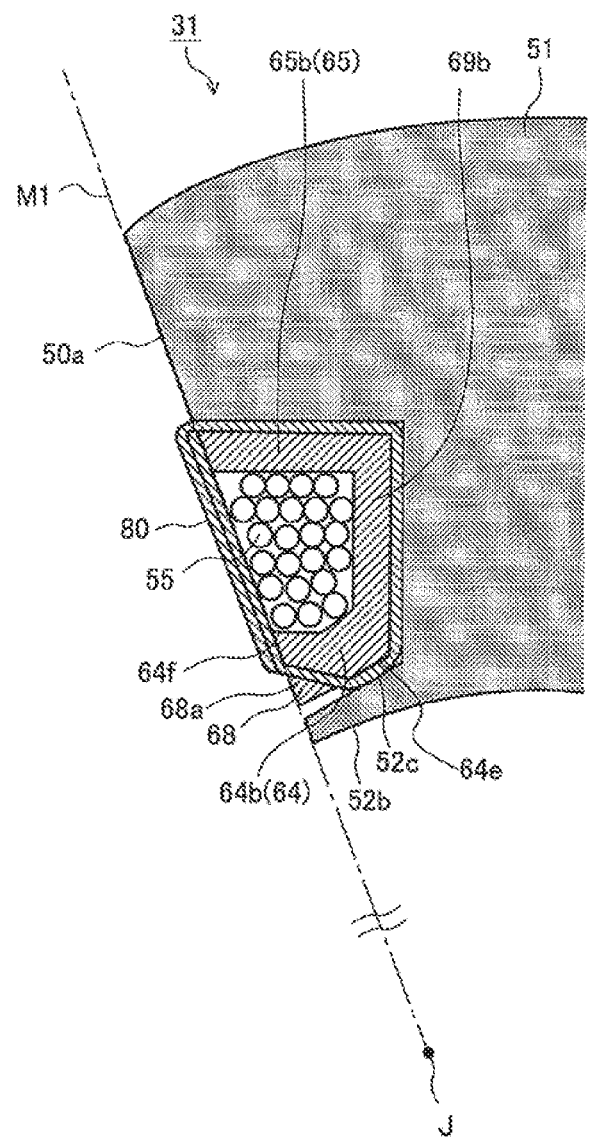
FIG. 19 is a horizontal sectional view of a stator 31 in embodiment 2 of the present invention.

FIG. 19 is a horizontal sectional view of a stator 31 in embodiment 2 of the present invention.

Figure 20:
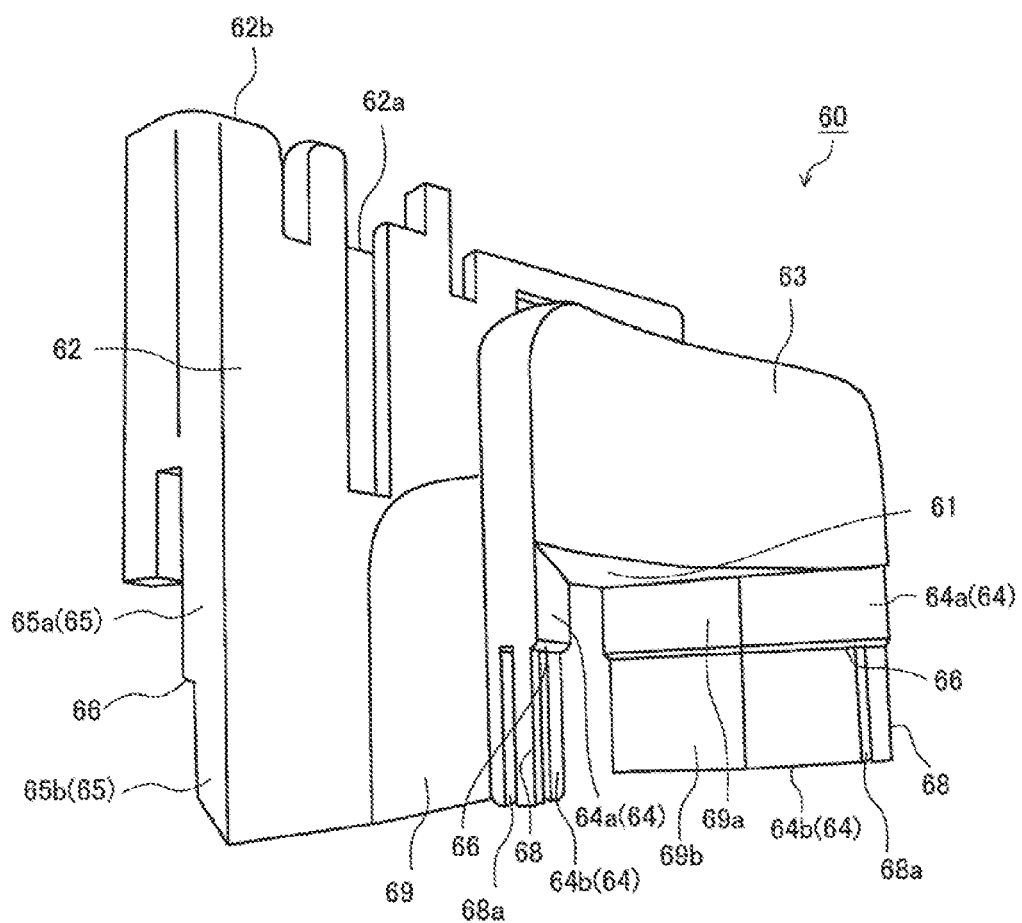
FIG. 20 is a perspective view of an upper insulator 60 in embodiment 2 of the present invention.

FIG. 20 is a perspective view of an upper insulator 60 in embodiment 2 of the present invention.

In embodiment 2, the upper insulator 60 includes inner peripheral legs 64 each including a retaining projection 68 formed to retain the insulating film 80.

As illustrated in FIGS. 19 and 20, the retaining projection 68 is a projection formed to provide a groove 68a which allows the insulating film 80 to be inserted into the inner peripheral leg 64. The horizontal section of the retaining projection 68 has, for example, a triangular shape. The width of the groove 68a is equal to the thickness t of the insulating film 80.

The inner peripheral leg 64 has the inner peripheral surface 64e formed in the direction toward the peripheral side of the stator unit 35, and the first side surface 64f provided in the peripheral direction of the stator unit 35. The groove 68a extends through the inner peripheral surface 64e and the first side surface 64f.

Since the inner peripheral leg 64 includes the retaining projection 68 which retains the insulating film 80 when the insulating film 80 is folded, no gap is provided between the insulating film 80 and the inner peripheral leg 64. On the inner peripheral side of each of the upper insulator 60 and the lower insulator 70, that is close to the rotor 32, no gap is provided between the insulating film 80 and the inner peripheral leg 64 or 74, as in embodiment 1. Therefore, foreign substances such as iron powder that fly off toward the stator unit 35 because of rotation of the rotor 32 do not stay. Therefore, the iron cores 50 and the windings 55 can be insulated from each other by an appropriate distance. Thus, an electric motor having a high reliability can be obtained.

The electric motor according to embodiment 2 includes:

(1) the stator unit 35 in which the plurality of stators 31 each including the iron core 50 made of a magnetic body are arranged annularly; the insulators provided at the respective ends of the iron core 50 in the axial direction of the stator unit 35; the windings 55 wound around the insulators; and the insulating films 80 each insulating the iron core 50 and the winding 55 from each other. The insulating film 80 is held and thus fixed between the iron core 50 and the insulators. The insulators each have the groove into which the insulating film 80 is inserted.

The electric motor according to embodiment 2 includes:

(2) the stator unit 35 in which the plurality of stators 31 each including the iron core 50 made of a magnetic body are arranged in an annular shape; the insulators provided at the respective ends of the iron core 50 in the axial direction of the stator unit 35; the windings 55 wound around the insulators; and the insulating films 80 insulating the iron cores 50 and the windings 55 from each other. The insulating films 80 are held and thus fixed between the iron cores 50 and the insulators. The inner peripheral legs 64 and 74 have grooves into which the insulating films 80 are inserted.

In the electric motor according to embodiment 2, (3) the inner peripheral legs have the respective inner peripheral surfaces 64e and 74e formed in the direction toward the peripheral side of the stator unit 35, and the respective first side surfaces 64f and 74f provided in the peripheral direction of the stator unit 35. The grooves 68a extend through the inner peripheral surfaces 64e and 74e and the first side surfaces 64f and 74f.

By virtue of the above configuration of the electric motor, the insulating films 80 can be fixed between the iron cores 50 and the inner peripheral legs 64 and 74 of the insulators with no gap. It is therefore possible to prevent deposition or stay of foreign substances since no gap is present, and insulate the iron cores 50 and the windings 55 from each other by an appropriate distance. An electric motor having a high reliability can be obtained.

REFERENCE SIGNS LIST 3 discharge port 4 chamber 4A depressed portion 4B discharge port 5 discharge valve 6 valve retainer 7A discharge muffler 7B discharge muffler 8 fixing members 10 compressing mechanism unit 11 compression chamber 20 discharge valve mechanism 21 fixed scroll 22 orbiting scroll 23 base plate portion 24 base plate portion 25 scroll lap 26 scroll lap 27 orbiting-scroll boss portion 30 electric motor unit 31 stator 32 rotor 33 rotating shaft 33a eccentric shaft portion 35 stator unit 40 pressure vessel 41 upper vessel 42 body portion 43 lower vessel 44 suction pipe 45 discharge pipe 46 first frame 47 second frame 48 ball bearing 50 iron core 50a second side surface 51 core-back portion 52 tooth portion 52a tooth base 52b tooth tip 52c outer peripheral surface 53 slot portion 55 winding 60 upper insulator 61 base portion 62 outer peripheral wall 62a slot 62b winding-holding portion 63 inner peripheral wall 64 inner peripheral leg 64a first inner peripheral leg 64b second inner peripheral leg 64e inner peripheral surface 64f first side surface 65 outer peripheral leg 65a first outer peripheral leg 65b second outer peripheral leg 66 step portion 67 folding ridge 68 retaining projection 68a groove 69 center leg 69a first center leg 69b second center leg 70 lower insulator 71 base portion 72 outer peripheral wall 73 inner peripheral wall 74 inner peripheral leg 74a first inner peripheral leg 74b second inner peripheral leg 74e inner peripheral surface 74f first side surface 75 outer peripheral leg 75a first outer peripheral leg 75b second outer peripheral leg 76 step portion 79 center leg 79a first center leg 79b second center leg 80 insulating film 81 projecting portion 82 engagement side portion 100 compressor

The invention claimed is:

1. An electric motor comprising:
a stator unit in which a plurality of stators including respective iron cores each made of a magnetic body are arranged annularly;
insulators provided at respective ends of the iron cores in an axial direction of the stator unit;
windings wound around the insulators; and
insulating films insulating the iron cores and the windings from each other, the insulating films being fixed between the iron cores and the insulators,
the iron cores including respective groove-shaped slot portions with which the insulators are engaged, with the insulating films interposed between the groove-shaped slot portions and the insulators,
the insulators including respective base portions around which the windings are wound, and legs which are engaged with the slot portions, with the insulating films interposed between the legs and the slot portions,
the legs including respective inner peripheral legs provided on an inner peripheral side of the stator unit, respective outer peripheral legs provided on an outer peripheral side of the stator unit, and respective center legs each of which connects one end side of an associated one of the inner peripheral legs and one end side of an associated one of the outer peripheral legs,
each of the inner peripheral legs, an associated one of the center legs and an associated one of the outer peripheral legs are continuous with each other and form a substantially U-shaped section,
the inner peripheral legs including respective grooves into which the insulating films are inserted,
the inner peripheral legs having respective inner peripheral surfaces formed on the inner peripheral side of the stator unit and respective first side surfaces formed in direction toward the peripheral side of the stator unit,
the grooves extending through the inner peripheral surfaces and the first side surfaces.

2. The electric motor of claim 1, wherein the legs include respective recesses with which the insulating films are in contact.

3. The electric motor of claim 1, wherein the legs includes respective first legs with which the iron cores are in contact, and respective second legs with which the insulating films are in contact, the second legs being thinner than the first legs.

4. The electric motor of claim 3, wherein each of thickness differences between the first legs and the second legs is equal to a thickness of each of the insulating films.

5. The electric motor of claim 1,
wherein the inner peripheral legs have respective inner peripheral surfaces formed on the inner peripheral side of the stator unit and respective first side surfaces formed in a direction toward the peripheral side of the stator unit,
wherein the iron cores include respective arc-shaped core-back portions, respective tooth portions provided at the core-back portions on the inner peripheral side, and respective tooth tips which are provided on the tooth portions and with which the inner peripheral legs are engaged,
wherein the tooth tips have respective outer peripheral surfaces formed on the outer peripheral side of the stator unit,
wherein the core-back portions have respective second side surfaces formed in the direction toward the peripheral side of the stator unit, and
wherein a difference between angles θ1 and θ2 is 5 degrees or smaller, where θ1 is an angle between each of the outer peripheral surfaces of the tooth tips and an associated one of the second side surfaces of the core-back portions, and θ2 is an angle between each of the inner peripheral surfaces and an associated one of the first side surfaces of the inner peripheral legs.

6. The electric motor of claim 1,
wherein the inner peripheral legs have respective inner peripheral surfaces formed on the inner peripheral side of the stator unit, and respective first side surfaces formed in the direction toward the peripheral side of the stator unit,
wherein the iron cores includes respective arc-shaped core-back portions, respective tooth portions provided at the core-back portions on the inner peripheral sides, and respective tooth tips which are provided on the tooth portions and with which the inner peripheral legs are engaged,
wherein the tooth tips have respective outer peripheral surfaces formed on the outer peripheral side of the stator unit,
wherein the core-back portions have respective second side surfaces formed in the direction toward the peripheral side of the stator unit, and
wherein angles θ1 and θ2 are equal to each other, where θ1 an angle between each of the outer peripheral surfaces of the tooth tips and an associated one of the second side surfaces of the core-back portions, and θ2 is an angle between each of the inner peripheral surfaces and an associated one of the first side surfaces of the inner peripheral legs.

7. The electric motor of claim 1, wherein a distance between the insulators provided at adjacent ones of the plurality of stators is four times a thickness of each of the insulating films.

8. The electric motor of claim 1, wherein a distance between the insulators provided at adjacent ones of the plurality of stators is smaller than four times a thickness of the insulating film.

9. The electric motor of claim 1, wherein the insulating films each include projecting portions at two respective ends of the each insulting film in the direction toward the peripheral side of the stator unit, the projecting portions each projecting in the axial direction.

10. A compressor provided with the electric motor of claim 1.

11. An electric motor comprising:
a stator unit in which a plurality of stators including respective iron cores each made of a magnetic body are arranged annularly;
insulators provided at respective ends of the iron cores in an axial direction of the stator unit;
windings wound around the insulators; and
insulating films insulating the iron cores and the windings from each other, the insulating films being fixed between the iron cores and the insulators,
the iron cores including respective groove-shaped slot portions with which the insulators are engaged, with the insulating films interposed between the groove-shaped slot portions and the insulators,
the insulators including respective base portions around which the windings are wound, and legs which are engaged with the slot portions, with the insulating films interposed between the legs and the slot portions,
the legs including respective inner peripheral legs provided on an inner peripheral side of the stator unit, respective outer peripheral legs provided on an outer peripheral side of the stator unit, and respective center legs each of which connects one end side of an associated one of the inner peripheral legs and one end side of an associated one of the outer peripheral legs,
each of the inner peripheral legs, an associated one of the center legs and an associated one of the outer peripheral legs are continuous with each other and form a substantially U-shaped section,
the inner peripheral legs including respective grooves into which the insulating films are inserted,
the inner peripheral legs having respective inner peripheral surfaces formed on the inner peripheral side of the stator unit and respective first side surfaces formed in a direction toward the peripheral side of the stator unit, the grooves extending through the inner peripheral surfaces and the first side surfaces,
the iron cores including respective arc-shaped core-back portions, respective tooth portions provided at the core-back portions on the inner peripheral side, and respective tooth tips which are provided on the tooth portions and with which the inner peripheral legs are engaged,
the tooth tips having respective outer peripheral surfaces formed on the outer peripheral side of the stator unit,
the core-back portions having respective second side surfaces formed in the direction toward the peripheral side of the stator unit,
a difference between angles θ1 and θ2 being 5 degrees or smaller, where θ1 is an angle between each of the outer peripheral surfaces of the tooth tips and an associated one of the second side surfaces of the core-back portions, and θ2 is an angle between each of the inner peripheral surfaces and an associated one of the first side surfaces of the inner peripheral legs.

12. A compressor provided with the electric motor of claim 11.

13. An electric motor comprising:
a stator unit in which a plurality of stators including respective iron cores each made of a magnetic body are arranged annularly;
insulators provided at respective ends of the iron cores in an axial direction of the stator unit;

windings wound around the insulators; and insulating films insulating the iron cores and the windings from each other, the insulating films being fixed between the iron cores and the insulators, the iron cores including respective groove-shaped slot portions with which the insulators are engaged, with the insulating films interposed between the groove-shaped slot portions and the insulators, the insulators including respective base portions around which the windings are wound, and legs which are engaged with the slot portions, with the insulating films interposed between the legs and the slot portions, the legs including respective inner peripheral legs provided on an inner peripheral side of the stator unit, respective outer peripheral legs provided on an outer peripheral side of the stator unit, and respective center legs each of which connects one end side of an associated one of the inner peripheral legs and one end side of an associated one of the outer peripheral legs, each of the inner peripheral legs, an associated one of the center legs and an associated one of the outer peripheral legs are continuous with each other and form a substantially U-shaped section, the inner peripheral legs including respective grooves into which the insulating films are inserted, the inner peripheral legs having respective inner peripheral surfaces formed on the inner peripheral side of the stator unit, and respective first side surfaces formed in the direction toward the peripheral side of the stator unit, the grooves extending through the inner peripheral surfaces and the first side surfaces, the iron cores including respective arc-shaped core-back portions, respective tooth portions provided at the core-back portions on the inner peripheral sides, and respective tooth tips which are provided on the tooth portions and with which the inner peripheral legs are engaged, the tooth tips having respective outer peripheral surfaces formed on the outer peripheral side of the stator unit, the core-back portions having respective second side surfaces formed in the direction toward the peripheral side of the stator unit, angles $\theta 1$ and $\theta 2$ being equal to each other, where $\theta 1$ an angle between each of the outer peripheral surfaces of the tooth tips and an associated one of the second side surfaces of the core-back portions, and $\theta 2$ is an angle between each of the inner peripheral surfaces and an associated one of the first side surfaces of the inner peripheral legs.

14. A compressor provided with the electric motor of claim 13.

* * * * *